(12) United States Patent
Damerla et al.

(10) Patent No.: US 11,576,094 B2
(45) Date of Patent: Feb. 7, 2023

(54) SYSTEMS AND METHODS FOR PASSIVE COLLECTION OF NEIGHBOR BASE STATION CONFIGURATION INFORMATION THROUGH HANDOVER MESSAGES

(71) Applicant: CommScope Technologies LLC, Hickory, NC (US)

(72) Inventors: Swami Rangaiah Damerla, Giddalur (IN); Vijayaraghavan Krishnaswamy, Bengaluru (IN); Pavan Kulkarni, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 99 days.

(21) Appl. No.: 16/735,441

(22) Filed: Jan. 6, 2020

(65) Prior Publication Data

US 2020/0275329 A1    Aug. 27, 2020

Related U.S. Application Data

(60) Provisional application No. 62/808,577, filed on Feb. 21, 2019.

(51) Int. Cl.
*H04W 4/00* (2018.01)
*H04W 36/00* (2009.01)
*H04W 36/34* (2009.01)

(52) U.S. Cl.
CPC ..... *H04W 36/00835* (2018.08); *H04W 36/34* (2013.01)

(58) Field of Classification Search
CPC ............. H04W 36/14; H04W 36/0061; H04W 36/00837; H04W 36/04; H04W 36/08; H04W 36/0083; H04W 36/00835
See application file for complete search history.

(56) References Cited

U.S. PATENT DOCUMENTS

| 8,121,087 B2 | 2/2012 | Ryu et al. |
| 8,996,009 B2 | 3/2015 | Li et al. |
| 9,344,929 B2 | 5/2016 | Shetigar et al. |
| 9,485,704 B2 | 11/2016 | Frenger et al. |

(Continued)

FOREIGN PATENT DOCUMENTS

| CN | 108282795 A | 7/2018 |
| EP | 2248372 A1 | 11/2010 |
| WO | 2013125918 A1 | 8/2013 |

OTHER PUBLICATIONS

International Searching Authority, "International Search Report and Written Opinion from PCT Application No. PCT/US2020/012410", from Foreign Counterpart to U.S. Appl. No. 16/735,441, dated Apr. 28, 2020, pp. 1 through 10, Published: WO.

(Continued)

*Primary Examiner* — Omoniyi Obayanju
(74) *Attorney, Agent, or Firm* — Fogg & Powers LLC

(57) ABSTRACT

Passive collection of neighbor base station configuration information through handover messages is provided. In one embodiment, a base station comprises: a processor coupled to a memory, the base station coupled to a core network for a wireless network operator, the base station radiates downlink RF signals to at least one UE and receives uplink RF signals from the UE. The processor implements: a UE handover function that receives and processes a handover request message associated with a UE transferring to the cell from a neighboring cell; and a handover request parser that evaluates information elements in the handover request message to extract neighbor information. The handover request parser stores the extracted neighbor information as a set of neighbor information in the memory; and wherein the processor is configured to adjust operation of the base station based on the set of neighbor information stored in the memory.

30 Claims, 5 Drawing Sheets

(56) References Cited

U.S. PATENT DOCUMENTS

| | | | | |
|---|---|---|---|---|
| 2008/0280613 | A1* | 11/2008 | Suh | H04W 36/0011 455/436 |
| 2010/0210268 | A1* | 8/2010 | Lim | H04W 36/08 455/436 |
| 2013/0316712 | A1* | 11/2013 | Lee | H04W 36/0005 455/436 |
| 2014/0162653 | A1* | 6/2014 | Lee | H04W 36/0061 455/436 |
| 2015/0049623 | A1* | 2/2015 | Yuk | H04W 36/0069 370/252 |
| 2015/0271714 | A1* | 9/2015 | Shetigar | H04W 36/0061 370/255 |
| 2017/0078895 | A1* | 3/2017 | Sriram | H04W 24/10 |

OTHER PUBLICATIONS

3GPP, "LTE; Evolved Universal Terrestrial Radio Access (E-UTRA); Radio Resource Control (RRC); Protocol specification (3GPP TS 36.331 version 15.3.0 Release 15)", ETSI TS 136 331 Technical Specification, V15.3.0, Oct. 2018, pp. 1-916, 3GPP.

3GPP, "LTE; Evolved Universal Terrestrial Radio Access Network (E-UTRAN); S1 Application Protocol (S1AP) (3GPP TS 36.413 version 15.3.0 Release 15)", ETSI TS 136 413 Technical Specification, V15.3.0, Sep. 2018, pp. 1-379, 3GPP.

European Patent Office, "Extended European Search Report from EP Application No. 20759576.0", from Foreign Counterpart to U.S. Appl. No. 16/735,441, dated Aug. 12, 2022, pp. 1 through 25, Published: EP.

Mediatek Inc., "TP on Basic HO Considering the FFS Issues", 3GPP TSG-RAN WG2 #99-bis, Prague, Czech, Oct. 9-13, 2017, R2-1710869, pp. 1 through5, downloaded by EPO on Sep. 29, 2017 from http://www.3gpp.org/ftp/tsg_ran/WG2_RL2/TSGR2_99bis/Docs/.

Nokia Siemens Networks et al., "Inter-RAT mobility to/from E-UTRAN", 3GPP TSG-RAN WG3 Meeting #62, Prague, Czech Republic, Nov. 10-14, 2008, R3-083538, 36.413CR 0283, Rev. 3, Current version: 8.3.0, pp. 1 through 82.

Rudd, "Opportunities and Challenges Driving C-RAN Forward", Strategy Analytics, Oct. 17, 2016, pp. 1 through 25, 3rd Generation Partnership Project (3GPP), Retrieved from the Internet: http://www.3gpp.org/ftp/Meetings_3GPP_SYNC/SA5/SON presentations/ on Nov. 14, 2016.

* cited by examiner

| | eNB1's view of the neighbors | eNb2 | eNb3 | eNb4 |
|---|---|---|---|---|
| Neighbor Key-info | operating band/bandwidth | | | |
| | dl-earfcn/ul-earfcn | | | |
| | pci | | | |
| | ecgi | | | |
| Neighbor entry-info | Learnt-via-method (enum) | | | |
| | Learnt-time, Entry Age | | | |
| | handover_stats | | | |
| | ranking | | | |
| Neighbor OneCell-info | RP_Location_info | | | |
| | IsLoadBalancingPartner | | | |
| | IsCoResidentPartner (1B2C case) | | | |
| CellAccessInfo | bandwidth | | | |
| | cellId | | | |
| | m_cellType | | | |
| | m_dlEarfcn | | | |
| | CellBarred | | | |
| | CSG_Indication/CSG_Identity | | | |
| CellSelectionInfo | q-RxLevMin | | | |
| | q-RxLevMinOffset | | | |
| | p-Max | | | |
| | FreqBandIndicator | | | |
| | PLMN-IdentityList | | | |
| | MultiBandIndicator | | | |

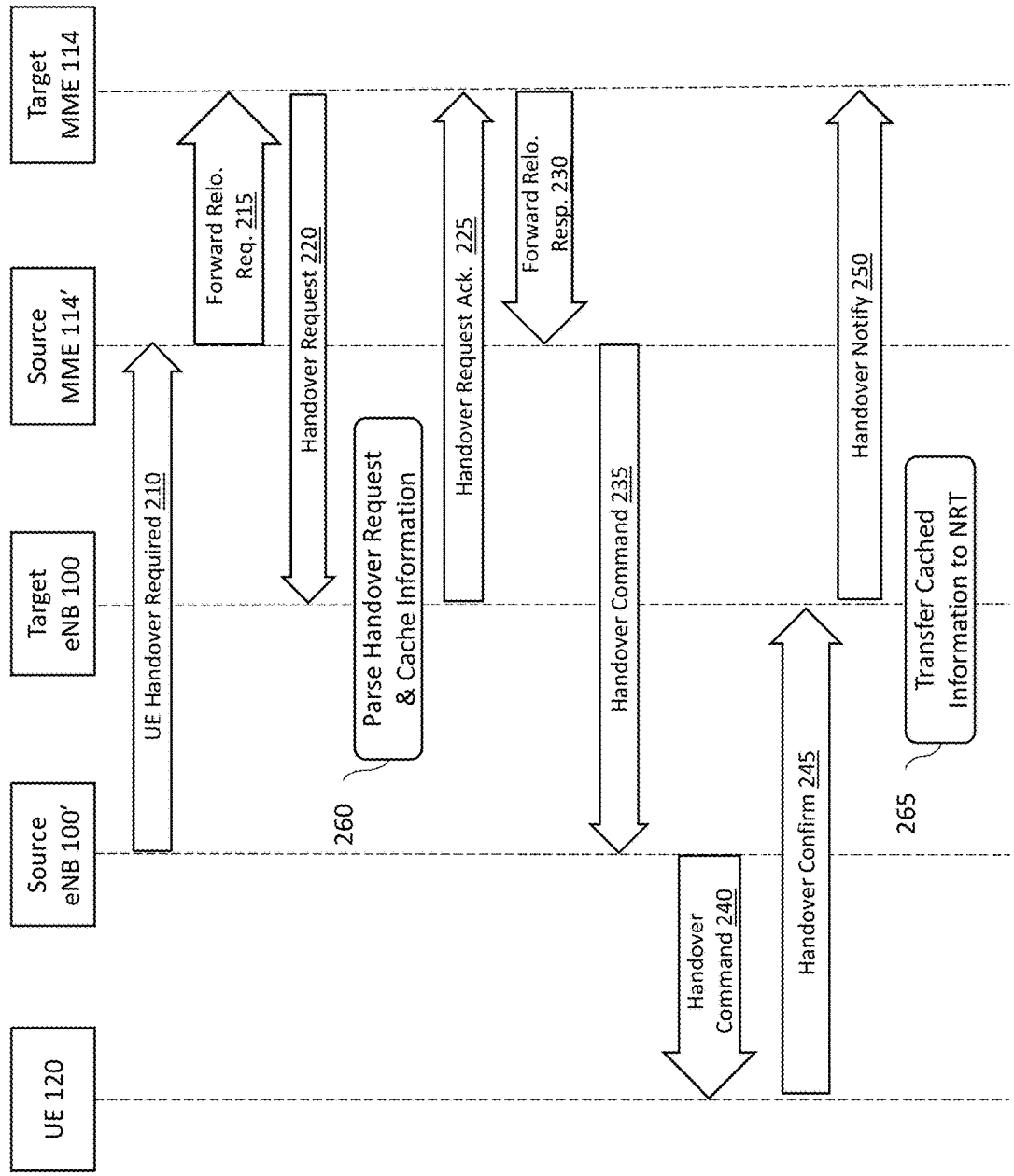

SYSTEMS AND METHODS FOR PASSIVE COLLECTION OF NEIGHBOR BASE STATION CONFIGURATION INFORMATION THROUGH HANDOVER MESSAGES

CROSS-REFERENCE TO RELATED APPLICATIONS

This application is a U.S. Patent Application claiming priority to, and the benefit of, U.S. Provisional Patent Application No. 62/808,577 titled "SYSTEMS AND METHODS FOR PASSIVE COLLECTION OF NEIGHBOR BASE STATION CONFIGURATION INFORMATION THROUGH HANDOVER MESSAGES" filed on Feb. 21, 2019, which is incorporated herein by reference in its entirety.

BACKGROUND

A Long Term Evolution (LTE) Evolved Universal Terrestrial Radio Access Network (E-UTRAN) (also sometimes referred to simply as the "radio access network" or "RAN") comprises a set of base stations that wirelessly communicate with user equipment (such as smartphones) using licensed radio frequency spectrum. Each base station is also generally referred to as an LTE Evolved Node B, "eNodeB" or "eNB." In providing wireless LTE service coverage to users across a region, multiple LTE base stations may be installed using equipment from multiple vendors, and/or operate on multiple carriers with different capabilities and configurations. When user equipment (UE) moves between eNodeBs, the user equipment's coverage is continued through the system using handovers and/or cell-reselection methods. In such an environment where multiple base stations may operate in close vicinity, it is important for each eNodeB to be aware of the operating configuration of neighbor base stations so that it may adjust its own operation to avoid conflicts and ease user equipment handovers.

There are multiple ways by which a base station may gather configuration information about neighboring base stations. Such methods include: having a Management System pushing neighbor configuration to each eNodeB, implementing Radio Environment Mapping (REM) in which each eNodeB tunes itself to the operating frequencies of its neighbors to read system-information messages to collect neighbor configuration information, leveraging user equipment to implement Automatic Neighbor Relation (ANR) (where a UE is instructed to perform measurements of the radio-environment and report back to its serving cell, and through LTE X2 Application Protocol interactions that enable the neighboring eNodeBs to communicate with each other.

However, there are limitations to each of these methods. For example, having a Management system pushing neighbor configuration information to each of the eNodeBs is tedious and resource-intensive and the configurations may become stale and require periodic re-push to refresh the information provided to other eNodeB. REM methods may cause service disturbances while scanning different neighbor frequencies with a full-band sweep to read system information. Additionally, it requires an eNodeB to repeat these measurements periodically to avoid stale neighbor information. The effectiveness of a REM scan is also constrained by the number of radio bands supported by the eNodeB performing the scan. For example, if an eNodeB supports only bands 1, 3 and 7, it cannot detect a neighbor eNodeB operating at band 41. ANR methods using UEs can fall short when a new frequency is introduced in the system and the eNodeB is not aware of the new frequency. Moreover, ANR methods require UE processing and RF resources. LTE X2 Application Protocol interactions require the implementation of IPSec tunnels to communicate to the network core and the resulting X2-traffic may become congested between eNodeBs at the core. Moreover, as there become an increasingly large number of cells installed in a neighborhood, establishing X2 relationship between eNodeB at each of those cells will become increasingly cumbersome.

SUMMARY

In one embodiment, a base station comprises: at least one processor coupled to a memory, wherein the base station is communicatively coupled to a core network for at least one wireless network operator, wherein the base station radiates downlink radio frequency signals to at least one user equipment (UE) served by the base station and receive uplink radio frequency signals from the at least one UE served by the base station in order to provide wireless communication services via a cell, wherein the processor is configured to implement: a user equipment handover function that receives and processes a handover request message associated with a UE transferring to the cell from a neighboring cell; and a handover request parser that evaluates information elements in the handover request message to extract neighbor information describing a configuration of a neighboring base station serving the neighbor cell, wherein the handover request parser stores the extracted neighbor information as a set of neighbor information in the memory; and wherein the processor is configured to adjust operation of the base station based on the set of neighbor information stored in the memory.

DRAWINGS

Embodiments of the present disclosure can be more easily understood and further advantages and uses thereof more readily apparent, when considered in view of the description of the preferred embodiments and the following figures in which:

FIG. 1B is an illustration of a set of neighbor information collected by an eNodeB for one example embodiment.

FIG. 2 is an information flow diagram illustrating an example of passive collection of neighbor information by an eNodeB as triggered by a handover of user equipment.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
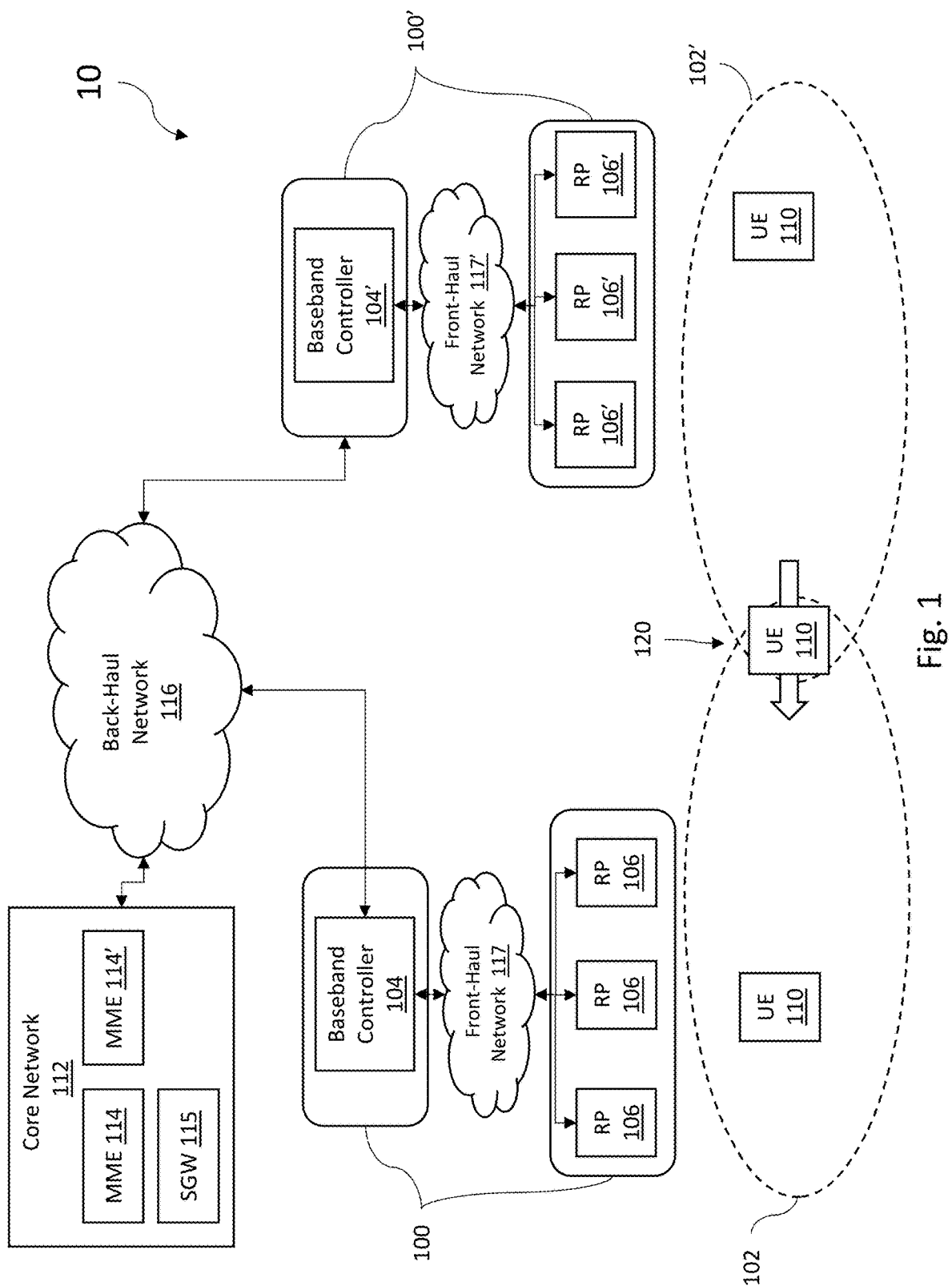
FIGS. 1 and 1A are block diagrams illustrating an example wireless communications system embodiment.

FIG. 1 is a block diagram illustrating an example embodiment of a wireless communications system 10. System 10 comprises multiple base stations 100. In the particular embodiment shown in FIG. 1, each base station 100 is implemented using a cloud radio access network (C-RAN) architecture that includes at least one baseband controller 104 and multiple remote radio points (RPs) 106. Each base station 100 is used to serve one or more cells 102 and to provide wireless communication services for one or more items of user equipment (UE) 110 served by the base station 100. Within the context of this architecture, the combination of baseband controller 104 and RPs 106 define a base station 100 (also referred to here as an "eNodeB" 100). It is to be understood, however, that in the embodiments described herein as well in other embodiments, any of the eNodeBs may be implemented in other ways (for example, as a traditional monolithic macro or small cell base station).

The eNodeB 100 provides user equipment (UE) 110 with wireless service by serving a cell 102 and is coupled to the wireless network operator's Evolved Packet Core (EPC) network, or as referred to herein, "core network" 112. As such, each RP 106 may include or be coupled to at least one antenna via which downlink RF signals are radiated to user equipment (UE) 110 within a coverage area for the cell 102, and via which uplink RF signals transmitted by UE 110 within the coverage area for the cell 102 are received. The UE 110 may include devices such as, but not limited to, cellular telephones, tablet computers, wearable computers, mobile media devices, mobile gaming devices, laptop or desktop computers, vehicle embedded computing devices, and so forth. It should be noted that in alternate implementations, the baseband controller 104 may be co-located at the same site with the RPs 106, or alternately remotely located outside of the site where the RPs 106 are deployed. In some embodiments, the baseband controller 104 may be co-located or otherwise associated with other baseband controllers of other base stations (e.g., other eNodeBs) to form a cluster. In some embodiments, baseband controllers that are part of the same cluster may be connected to the same front-haul network for communicating with their respective remote radio points. Moreover, baseband controllers that are part of the same cluster may therefore exchange information over the front-haul network.

The eNodeB 100, particularly the RPs 106 of eNodeB, may be deployed at a facility in order to provide wireless coverage and capacity to a coverage area within the facility. Such a facility may include, for example, a building, plant, campus, hotel, resort, amusement park, stadium or other structures of a public or private facility or combinations thereof. In some configurations, the site includes a region that is at least partially indoors, but other alternatives are possible.

Each controller 104 and RP 106 (and the functionality described as being included therein), as well as the eNodeB 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the eNodeB 100 more generally, can be implemented in other ways.

In the embodiment shown in FIG. 1, each eNodeB 100 is coupled to a core network 112 of at least one wireless network operator via a back-haul network 116. In the embodiment of FIG. 1, back-haul network 116 may be implemented as an Internet Protocol (IP) network implemented with one or more switches, routers, and/or other networking devices and may at least in part use the Internet. However, it is to be understood that the back-haul network 116 can be implemented in other ways. In the embodiment shown in FIG. 1, wireless communication system 100 may be implemented as a Long Term Evolution (LTE) radio access network providing wireless services to the UE 110 using an LTE air interface using one or more licensed and/or unlicensed RF carriers. However, it should be noted that the embodiments presented in this disclosure may be used with other wireless network protocols. For example, other wireless network protocols may include, but are not limited to, 5G cellular mobile communications, NarrowBand-Internet of Things (NB-IoT), Machine to machine networks vehicle-to-vehicle (V2V) or Vehicular ad-hoc networks (VANETs), and so forth. Access to core network 112 via eNodeB 100 thus provides UEs 110 with wireless data and/or voice communication services.

In some embodiments, each core network 112 may be implemented as an Evolved Packet Core (EPC) 112 comprising standard LTE EPC network elements such as, but not limited to, a mobility management entity (MME) 114 and a Serving Gateway (SGW) 115 and, optionally, a Home eNodeB gateway (HeNB GW) and a Security Gateway (SeGW), for example. Each baseband controller 104 may communicate with the MME 114 and SGW 115 in the EPC core network 112 using an LTE S1 interface and communicate with other eNodeBs (such as eNodeB 100' for example) using an LTE X2 interface.

Each baseband controller 104 and radio point 106 are implemented so as to use an air interface that supports frequency-division duplexing (FDD) and/or time-division duplexing (TDD). Further, the baseband controller 104 and the radio points 106 can be implemented to use an air interface that supports multiple-input-multiple-output (MIMO), single-input-single-output (SISO), single-input-multiple-output (SIMO), multiple-input-single-output (MISO), and/or beam forming schemes. In some embodiments, the baseband controller 104 and the radio points 106 may implement one or more of the LTE transmission modes. Moreover, the baseband controller 104 and the radio points 106 can be configured to support multiple air interfaces and/or to support multiple wireless operators. In some embodiments, connectivity between the baseband controller 104 and RPs 106 of eNodeB 100 may be implemented through a front-haul network 117.

Figure 1A:
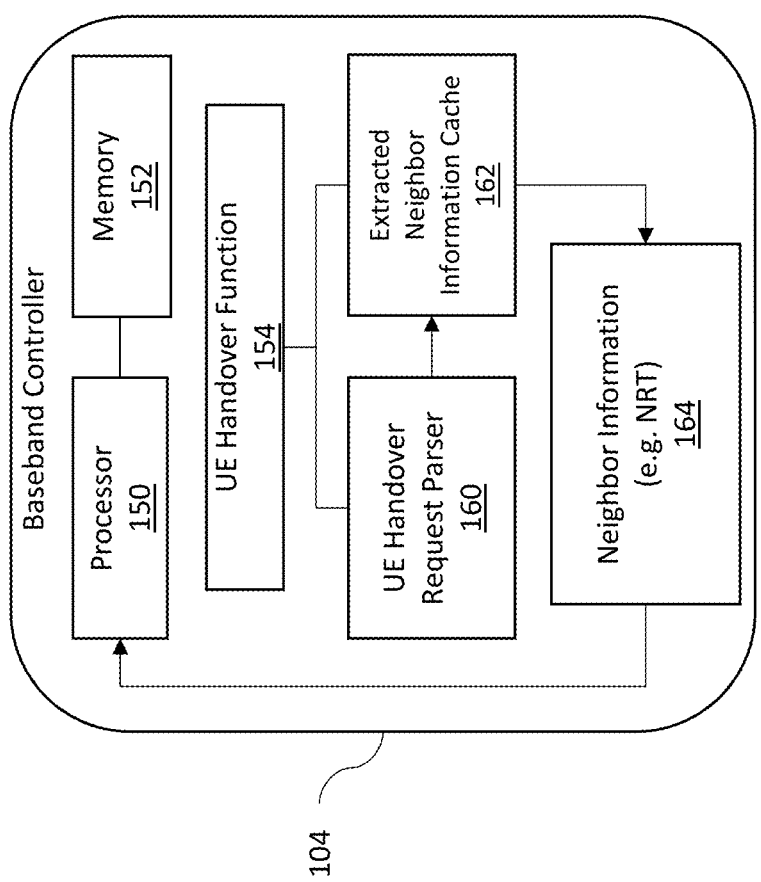

As shown in FIG. 1A, each baseband controller 104 may comprise at least one processor or other programmable device 150 coupled to or including a memory 152 if necessary, wherein the processor or other programmable device 150 executes code or is otherwise programmed or configured to implement the various functions and operations attributed here to the eNodeB 100, baseband controller 104, and/or RP 106 as described throughout this disclosure. The eNodeB 100 further includes a handover function 154 that causes baseband controller 104 to process handover messages and perform UE 110 handovers as further described below. The eNodeB 100 further includes a UE handover request parser 160 function, an extracted neighbor information cache 162, and neighbor information 164. In some embodiments, the extracted neighbor information cache 162 may be a cache memory device separate from the memory 152 memory device, or alternately be implemented in memory 152.

In some embodiments, the baseband controller 104 and/or RPs 106 perform analog radio frequency (RF) functions for the air interface as well as digital Layer 1, Layer 2, and Layer 3 (of the LTE radio access interface protocols defined by the Third Generation Partnership Project (3GPP)) functions for the air interface. For example, each baseband controller 104 may implement Layer 3 (L3) functionality, Layer 2 (L2) functionality, and/or Layer 1 (L1) functionality and may be configured to perform at least some of the L3 processing, L2 processing, and/or L1 processing, respectively, for the LTE air interface implemented by the eNodeB 100. Each RP 106 may also optionally include L1 functionality that implements any L1 processing for the air interface that is not performed in the baseband controller 104 and one or more radio frequency (RF) circuits that implement the RF front-end functions for the air interface and the one or more antennas associated with that RP 106. Other possible functional splits between the baseband controller 104 and RPs 106 of the L1-L3 processing for the air interface include: (1) all L1-L3 processing in baseband controller 104 (2) all L2 and L3 processing in baseband controller 104 and all L1 processing in RPs 106; (3) all L3 and some L2 processing in baseband controller 104 and all L1 and some L2 processing in RPs 106; (4) all L3 processing in baseband controller 104 and all L1-L2 processing in RPs; and (5) some L3 processing in baseband controller 104 and some L3 and all L1-L2 processing in the RPs 106. In some configurations, all RF front-end processing for the air interface and the one or more antennas is performed in the RPs 106, and the baseband controller 104 does not perform any RF processing for the air interface or the antennas. Still other configurations are possible. Data can be front-hauled between the baseband controller 104 and RPs 106 over front-haul network 117 in varies ways including, but not limited to, using switched Ethernet networks and/or front-haul interfaces and techniques specified in the Common Public Radio Interface (CPRI) and/or Open Base Station Architecture Initiative (OBSAI) family of specifications.

FIG. 1 also illustrates a second base station, eNodeB 100', that provides wireless coverage to UE 110 within its associated cell 102'. For the purpose of this example embodiment, eNodeB 100' is a neighbor eNodeB to eNodeB 100 so that coverage areas for cells 102 and 102' are adjacent coverage areas and may at least partially overlap as shown in FIG. 1. The eNodeB 100' is coupled to the core network 112 via the back-haul network 116 (or another back-haul network). Access to the core network 112' via eNodeB 100' provides UEs 110 within cell 102' with wireless data and/or voice communication services.

In this exemplary embodiment, the second eNodeB 100' includes at least one baseband controller 104' and multiple remote RPs 106' that provide wireless communication services within at least one cell 102' for one or more wireless network operators. In some embodiments, connectivity between the baseband controller 104' and RPs 106' of eNodeB 100' may be implemented through a network 117', which may be referred to as a "front-haul" network 117'.

It should be understood that each element in FIG. 1 designated by a primed reference numeral may provide the same operational functionality as described above with respect to the corresponding numbered element designated by a non-primed reference numeral. It should also be understood that while this description discusses the interactions between eNodeB 100 and a single neighboring eNodeB 100', embodiments may include multiple eNodeB 100' that are neighbors of eNodeB 100. The disclosed interactions between eNodeB 100 and the illustrated neighboring eNodeB 100' in FIG. 1 would be applicable to each of those additional multiple neighboring eNodeB.

In some embodiments, eNodeB 100 and eNodeB 100' may be part of the same cluster, in the manner described above. As such, while in some embodiments the front-haul networks 117 and 117' may be distinct networks, in other embodiments front-haul networks 117 and 117' may constitute the same front-haul network.

Embodiments of the present disclosure facilitate the passive collection by a base station (e.g., eNodeB 100) of its neighbor information that describes the configuration of a neighbor base station (e.g., eNodeB 100'). In the embodiments shown in FIG. 1, the passive collection of neighbor information is initiated by the handover of a UE 110 from the cell 102' associated with eNodeB 100' to the cell 102 associated with eNodeB 100. As mentioned above, eNodeBs in LTE deployments may be manufactured by multiple vendors, operate on multiple carriers, with varying equipment of different capabilities and configurations, it is important for eNodeB 100 to maintain information regarding the configuration and system parameters of neighboring eNodeB so that it may use them to adjust its own configuration for providing successful LTE service. The collected neighbor information may be maintained in the memory 152 of the eNodeB 100 as neighbor information 164 in any form, such as but not limited to a neighbor relations table (NRT) 164. The neighbor information 164 is accessible to the processor 150 so that the processor 150 may adjust the operation of eNodeB 100 based on that information.

As the term is used herein, the term "neighbor information" includes information pertaining to the configuration of any neighboring base station, such as eNodeB 100' for example. FIG. 1B is an illustration of an example NRT 164 that records operating parameters for a plurality of neighboring eNodeB (shown as eNb2, eNb3, eNb4). The neighbor information for the neighboring eNodeB 100' collected into neighbor information 164 may include, for example, bandwidth and frequency bands, target eNodeB reference signal power; Physical Random Access Channel (PRACH) configuration information of neighboring cells, and cell global identity (CGI) information. Neighbor information can also include eNodeB configuration information that is not otherwise transmitted between eNodeBs over an X2 interface. Other examples of neighbor information include common channel information, comprising system control information communicated in a broadcast control channel (BCCH), including downlink system bandwidth, antenna configuration, reference signal power, absolute radio-frequency channel numbers (ARFCNs), identity, and/or configuration and available features of the eNodeB. Neighbor information may further include any eNodeB configuration information carried in master information blocks (MIBs) and system information blocks (SIBs) in the LTE network and associated with a specific eNodeB. Other relevant information that may comprise relevant neighbor information is illustrated in FIG. 1B and further discussions below. Moreover, as shown in the example NRT 164 in FIG. 1B, in some embodiments the neighbor information 164 may further include information about the collected information, such as how the method by which the neighbor information was collected, the time the information was collected and/or the age of the table entry (i.e., how long ago the information was collected).

FIG. 2 is an information flow diagram illustrating the passive collection of neighbor information by the eNodeB 100 that is triggered by a UE 110 handover from the cell 102' associated with eNodeB 100' to the cell 102 associated with eNodeB 100. In other words, eNodeB 100' for this example is the "source eNodeB" currently serving a UE 110 that is about to transfer from the cell 102' to the cell 102. This handing over UE 110 (i.e., the UE 110 that is being handed over from cell 102' to cell 102) is shown in FIG. 1 at 120 and will be referred to as UE 120. Accordingly, eNodeB 100 for this example is the "target eNodeB" to which that UE 120 is being transfer to. Here, the source eNodeB 100' has determined that a handover of UE 120 is required and sends a Handover Required 210 message to its corresponding source MME 114' associated with eNodeB 100'. This message is forwarded as a Forwarding Relocation Request 215 from the source MME 114' to the target MME 114 associated with the eNodeB 110 that has been selected to pick up service to UE 120. (As noted above, it may be the case that the source MME 114' and the target MME 114 are the same MME or a different MMEs.) As would be understood, handovers of UE between cells served by different base stations may be triggered in response to multiple factors, the details of which are beyond this disclosure. As one example for the purpose of illustration, it may be assumed that handover of UE 120 is initiated because UE 120 is traveling away from the source eNodeB 100' causing an attenuation of signal power and/or quality beyond established acceptable quality thresholds. It should be noted that the transmission of the Handover Required 210 is triggered because of some condition or event that necessitates UE 120 served by source eNodeB 100' to be handed over to the target eNodeB 100 (for example, in order to maintain continuity and/or quality of service).

Upon receiving the Forwarding Relocation Request 215 message, the Target MME 114 transmits a Handover Request 220 message to the target eNodeB 100 that will receive UE 120. At the target eNodeB 100, the Handover Request 220 is processed by the UE handover function 154. Within the Handover Request 220, information is available to the UE handover function 154 in the form of Information Elements (IE) that comprise containers and other data elements describing the configuration of the source eNodeB 100' that originally initiated the Handover Required 210 message. For example, in one embodiment the source eNodeB 100' includes in the Handover Required 210 message a "Source to Target Transparent Container" that is passed to the target eNodeB 100. As defined by the 3rd Generation Partnership Project (3GPP) Technical Specification (TS) 36.413, the Source to Target Transparent Container is used to transparently pass radio related information from the handover source eNodeB to the handover target eNodeB. The source MME 114' forwards the container to the selected target MME 114, which then includes that container with the IE carried by the Handover Request 220 to the target eNodeB 100. The Source to Target Transparent Container carries a Radio Resource Control (RRC) container, Radio Bearer information and UE history information that will assist the target eNodeB 100 in allocating resources for the UE 120. Moreover, with embodiments of the present disclosure, the Source to Target Transparent Container may be parsed by the handover request parser 160 to extract information that can be used for populating the neighbor information 164 stored by eNodeB 100. For example, As-config is an IE included in the RRC Container that indicates the operating bands, bandwidth, Cell ID, q-RXLevMin and other parameters of the source eNodeB 110'. Other examples of information provided by fields of the As-config IE are shown in Table I below from Section 10.3 of 3GPP TS 36.331 which is incorporated herein by reference.

TABLE 1

AS-Config field descriptions sourceMeasConfig - Measurement configuration in the source cell. The measurement configuration for all measurements existing in the source cell when handover is triggered shall be included. See 10.5.
sourceRadioResourceConfig - Radio configuration in the source cell. The radio resource configuration for all radio bearers existing in the source cell when handover is triggered shall be included. See 10.5.
sourceSecurityAlgorithmConfig - This field provides the AS integrity protection (SRBs) and AS ciphering (SRBs and DRBs) algorithm configuration used in the source cell.
sourceMasterInformationBlock - MasterInformationBlock transmitted in the source cell.
sourceSystemInformationBlockType1 - SystemInformationBlockType1 transmitted in the source cell
sourceSystemInformationBlockType2 - SystemInformationBlockType2 transmitted in the source cell
antennaInfoCommon - This field provides information about the number of antenna ports in the source cell.
sourceDL-CairierFreq - Provides the parameter Downlink EARFCN in the source cell, see TS 36.101 [42].
sourceOtherConfig - Provides other configuration in the source cell.

As such, without having to expend extra processing and bandwidth resources to send out queries or other messages to neighboring eNodeBs and/or UEs in order to solicit neighbor information, eNodeB 100 may instead passively gather that information by parsing Handover Request 220 messages that it already receives in due course. The UE 110 entering the cell 102 will naturally be arriving, in most cases, from eNodeB 100' that are neighbors of eNodeB 100 and for that reason the IE extracted from received Handover Requests 220 by handover request parser 160 will include information that is mostly relevant to the neighboring eNodeBs of eNodeB 100. Furthermore, this mechanism of parsing received handover requests 220 has an advantage in that is permits the eNodeB 100 to learn of the existence of neighboring eNodeBs that it may not previously have been aware of. That is, the reception by eNodeB 100 of a handover of a UE 110 from a previously unknown eNodeB 100' will essentially serve to introduce eNodeB 100 to that eNodeB 100'. The eNodeB 100 may then respond by updating neighbor information 164 accordingly to add fields associated with the newly found eNodeB 100'. Such a dynamic learning behavior permits eNodeB 100 to quickly and efficiently populate and refresh neighbor information 164, especially in environments where many UE 110 can be expected to traverse through the coverage area associated with the cell 102 (for example, in shopping centers, sports stadiums, office buildings).

Returning to the flow diagram of FIG. 2, once the target eNodeB 100 has allocated resources to accommodate receiving UE 120, it transmits a Handover Request Acknowledge 225 message back to the Target MME 114 to confirm its ability to handle the requested handover. Given this confirmation, the Target MME 114 affirmatively responds to the Forward Relocation Request 215 message by transmitting a Forward Relocation Response 230 message back to the Source MME 114'. A Handover Command 235 is generated by the Source MME 114' to the source eNodeB 100', which triggers the source eNodeB 100' to send a Handover Command 240 to the UE 120 to switch its wireless service connections from source eNodeB 100' to the target eNodeB 100'. UE 120 then confirms its successful handover to target eNodeB 100 by transmitting Handover Command 245 to the UE Handover Function 154 of target eNodeB 100. The UE Handover Function 154, in turn, then notifies Target MME 114 via a Handover Notify 250 message that the target eNodeB 100 has successfully received and established wireless connectivity with UE 120.

In some embodiments, instead of immediately updating the NRT 164 with neighbor information extracted from a Handover Request 220, the handover request parser 160 instead temporarily stores (e.g., caches) that neighbor information in neighbor information cache 162 to provide time to confirm that the extracted information is trustworthy. For example, although the target eNodeB 100 may receive a handover request 220 associated with a UE 120, the UE 120 receiving the corresponding Handover Command 240 may reject that command or otherwise fail to successfully establish a connection with target eNodeB 100. Such an event may indicate that information carried by the Source to Target Transparent Container generated by the source eNodeB 100' contains wrong or invalid information and therefore should not be used by the target eNodeB 100 to update the neighbor information 164. Accordingly, in some embodiments, after receiving the Handover Request 220, the handover request parser 160 stores the extracted neighbor information in neighbor information cache 162 until the UE handover function 154 processes the Handover Confirm 245 message from the UE 120, and is ready to transmit the Handover Notify 250 message to Target MME 114. In one embodiment, once the Handover Notify 250 is transmitted, the neighbor information corresponding to that handover that is stored in the neighbor information cache, is transferred to the neighbor information 164.

In some embodiments, neighbor information may also be transferred in the reverse direction, where the source eNodeB 100' can learn neighbor information from the target eNodeB 100. For example, the Handover Request Acknowledge 225 message includes a Target to Source Transparent Container that conveys neighbor information relevant to the configuration of the target eNodeB 100. This container may be extracted from the Handover Request Acknowledge 225 by the target MME 114. From the target MME 114, it is transferred to the source MME 114' and then embedded in the Handover Command 235 message to the source eNodeB 100'. In such embodiments, the UE Handover Request Parser 160 of the source eNodeB 100' may parse the Handover Command 235 to extract information that can be used for populating the neighbor information 164 stored by eNodeB 100'. For example, from the Target to Source Transparent Container, UE Handover Request Parser 160 of the source eNodeB 100' may process the MeasConfig information located in the RRC Reconfiguration Message IE (as described in 3GPP 36.413 Section 9.2.1.57, which is incorporated herein by reference) to obtain at least a partial set of neighbor information.

The passive collection of neighbor information as described herein may also be used to facility other information exchanges. For example, in one embodiment, the UE Handover Request Parser 160 may, from parsing handover messages, identify newly introduced carrier frequencies or inter Radio Access Technologies (RAT) frequency carriers. For example, when a new carrier frequency is brought into a coverage area, self-learning of newly introduced frequency carrier is possible at eNodeB so that manual network level configuration updates can be avoided. Collected neighbor information may be used to learn about the carrier-aggregation capabilities/different bearer capabilities, and/or CSG capabilities of a neighbor base station and accordingly fine tune parameters associated with deciding on the future handover-candidates. The UE Handover Request Parser 160 may extract neighbor information with respect to the specific radio points near to a neighbor base station, and accordingly update the neighbor information table, which can be useful for optimizing system parameters like power-levels, mobility measurements, threshold configurations, and the like. Moreover, extracted neighbor information may also include system information about neighbors to the neighboring base station so that an overall radio-environment for the entire system may be quickly learned. In some embodiments, as base stations can encounter failures and/or service outages for some period, in some embodiments, the UE Handover Request Parser 160 may ensure that neighbor information is fresh and up to date by ageing out stale neighbors from the neighbor information 164 automatically and avoiding stale neighbors for handovers. Fresh neighbor information may also help avoid situations like PCI collisions, PCI confusions, RACH parameter collisions, and the like. Passive learning of neighbor information can be useful in identifying system level issues related to configuration changes happening on the neighbors. In some embodiments, the neighbor information 164 may include and maintain last X configparameter sets, along with a time of the change, for each of the neighbor base stations learned. Whenever certain key parameters in the neighbor information 164 changes, alarms can be triggered. Such information may service as valuable debugging information to understand certain key KPI degradation incidents like low RRC connections, low RACH attempts in the system. For Example, if there is a parameter change like ac-BarringInfo, PRACH configuration, power level configurations, then a neighbor entry can be appropriately ranked from then onwards.

Figure 3:
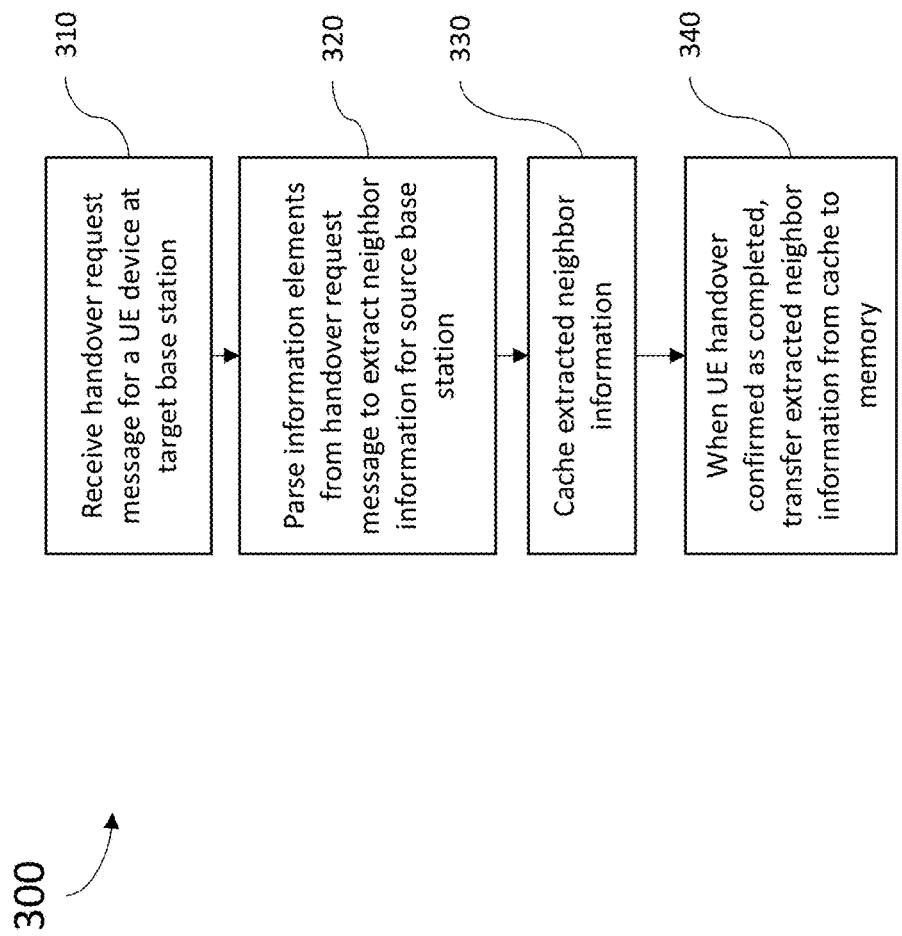
FIG. 3 is an example embodiment for a method of the present disclosure for passive neighbor information.

FIG. 3 is an example embodiment for a method 300 for passive neighbor information collection for a base station of the present disclosure. It should be understood that the features and elements described herein with respect to the method 300 shown in FIG. 3 and the accompanying description may be used in conjunction with, in combination with, or substituted for elements of any of the other embodiments discussed herein, and vice versa. Further, it should be understood that the functions, structures and other description of elements associated with embodiments of FIG. 3 may apply to like named or described elements for any of the Figures and embodiments and vice versa.

The method 300 begins at 310 with receiving a handover request message associated with a UE being handed over from a source base station (e.g., a source eNodeB) to a target base station (e.g., a target eNodeB). The method proceeds to 320 with parsing information elements from the handover request to extract neighbor information. In some embodiments, the information element may comprise a source to target transparent container that carries information about the source base station inserted into the container by the source base station. The method proceeds to 330 where the extracted neighbor information is cached. The method proceeds to 340 where, when successful handover of the UE to the target base station is confirmed by the target base station, the method proceeds with transferring the extracted neighbor information from the cache to a set of neighbor information stored memory, such as an NRT. In some embodiments, the extracted neighbor information may be stored directly to the set of neighbor information without caching. Operation of the target base station may then be adjusted based on the set of neighbor information stored memory.

EXAMPLE EMBODIMENTS

Example 1 includes a base station comprising: at least one processor coupled to a memory, wherein the base station is communicatively coupled to a core network for at least one wireless network operator, wherein the base station radiates downlink radio frequency signals to at least one user equipment (UE) served by the base station and receives uplink radio frequency signals from the at least one UE served by the base station in order to provide wireless communication services via a cell, wherein the processor is configured to implement: a user equipment handover function that receives and processes a handover request message associated with a UE transferring to the cell from a neighboring cell; and a handover request parser that evaluates information elements in the handover request message to extract neighbor information describing a configuration of a neighboring base station serving the neighbor cell, wherein the handover request parser stores the extracted neighbor information as a set of neighbor information in the memory; and wherein the processor is configured to adjust operation of the base station based on the set of neighbor information stored in the memory.

Example 2 includes the base station of example 1, wherein the base station comprises part of a cloud radio access network (C-RAN) architecture comprising a baseband controller and a plurality of radio points.

Example 3 includes the base station of example 2, wherein the baseband controller is communicatively coupled to the plurality of radio points by a switched Ethernet network.

Example 4 includes the base station of any of examples 1-3, wherein the set of neighbor information stored in the memory is stored in the form of a neighbor relations table.

Example 5 includes the base station of any of examples 1-4, further comprising a cache coupled to the handover request parser.

Example 6 includes the base station of example 5, wherein the handover request parser temporarily stores the extracted neighbor information in the cache until a successful handover of the UE is confirmed.

Example 7 includes the base station of any of examples 5-6, wherein the handover request parser transfers the extracted neighbor information from the cache to the set of neighbor information stored in the memory in response to receiving a handover confirm message from the UE.

Example 8 includes the base station of any of examples 1-7, wherein the information elements from the handover request message comprise a Source-to-Target Transparent Container, wherein the handover request parser generates the extracted neighbor information from the Source-to-Target Transparent Container.

Example 9 includes the base station of any of examples 1-8, wherein the extracted neighbor information includes at least operating band, bandwidth and radio resource configuration information for the neighboring base station providing wireless communication services to the neighboring cell.

Example 10 includes the base station of any of examples 1-9, wherein the handover request parser is further configured to evaluate information elements embedded into a handover command message associated with UE transferring from the cell to a neighboring cell, to extract additional neighbor information describing a configuration of a neighboring base station serving the neighboring cell.

Example 11 includes the base station of example 10, wherein the information elements from the handover command message comprise a Target-to-Source Transparent Container, wherein the handover request parser generates the extracted additional neighbor information from the Target-to-Source Transparent Container.

Example 12 includes the base station of any of examples 1-11, wherein based on the extracted neighbor information, the base station identifies one or more of: newly introduced carrier frequencies or Radio Access Technologies (RAT) frequency carriers; at least one of carrier-aggregation capabilities, different bearer capabilities, and closed subscriber group (CSG) capabilities of a neighbor base stations, and fine tunes parameters associated with deciding on the future handover-candidates; information with respect to the specific radio points near to a neighbor base station to optimize system parameters including at least one of power-levels, mobility measurements, or threshold configurations; system information about neighbors to a neighboring base station; or identifying system level issues related to configuration changes on neighboring base stations.

Example 13 includes the base station of any of examples 1-12, wherein the processor is configured to trigger alarms indicating system level configuration changes at a neighboring base station based on changes to selected items of neighbor information.

Example 14 includes the base station of any of examples 1-13, wherein the UE Handover Request Parser is configured to purge items of neighbor information based on a length of time since extraction.

Example 15 includes a method for passive neighbor information collection for a base station, wherein the base station is communicatively coupled to a core network for at least one wireless network operator, wherein the base station radiates downlink radio frequency signals to at least one user equipment (UE) served by the base station and receive uplink radio frequency signals from the at least one UE served by the base station in order to provide wireless communication services via a cell, the method comprising: receiving a handover request message associated with a UE being handed over to the base station; parsing information elements from the handover request message to extract neighbor information about a neighboring base station; storing extracted neighbor information as a set of neighbor information in a memory; and adjusting operation of the base station based on the set of neighbor information.

Example 16 includes the method of example 15, wherein the base station comprises part of a cloud radio access network (C-RAN) architecture comprising a baseband controller and a plurality of radio points.

Example 17 includes the method of example 16, wherein the baseband controller is communicatively coupled to the plurality of radio points by a switched Ethernet network.

Example 18 includes the method of any of examples 15-17, wherein the UE being handed over to the base station is transferring to the cell from a neighboring cell.

Example 19 includes the method of any of examples 15-18, further comprising: caching the extracted neighbor information prior to storing the extracted neighbor information in the set of neighbor information in the memory; and transferring the extracted neighbor information from the cache to the set of neighbor information stored in the memory when a successful handover of the UE is confirmed.

Example 20 includes the method of any of examples 15-19, wherein the extracted neighbor information is transferred to the set of neighbor information stored in the memory in response to receiving a handover confirm message from the UE.

Example 21 includes the method of any of examples 15-20, wherein the set of neighbor information stored in the memory is stored in the form of a neighbor relations table.

Example 22 includes the method of any of examples 15-21, wherein the information elements from the handover request message comprise a Source-to-Target Transparent Container, wherein the extracted neighbor information is extracted from the Source-to-Target Transparent Container.

Example 23 includes the method of any of examples 15-22, wherein the extracted neighbor information includes at least operating band, bandwidth and radio resource configuration information for the neighboring base station providing wireless communication services to a neighboring cell.

Example 24 includes the method of any of examples 15-23, wherein the base station providing wireless communication services to the cell comprises a target eNodeB and the neighboring base station providing wireless communication services to a neighboring cell comprises a source eNodeB, wherein the handover request message is associated with a handover of the UE from the source eNodeB to the target eNodeB.

Example 25 includes the method of any of examples 15-24, wherein the base station and neighboring base station are both communicatively coupled to the core network by a back-haul network.

Example 26 includes the method of any of examples 15-25 further comprising: evaluating information elements embedded into a handover command message associated with UE transferring from the cell to a neighboring cell, to extract additional neighbor information describing a configuration of a neighboring base station serving the neighboring cell.

Example 27 includes the method of example 26, wherein the information elements from the handover command message comprise a Target-to-Source Transparent Container, wherein the handover request parser generates the extracted additional neighbor information from the Target-to-Source Transparent Container.

Example 28 includes the method of any of examples 15-27, wherein based on the extracted neighbor information, the base station identifies one or more of: newly introduced carrier frequencies or Radio Access Technologies (RAT) frequency carriers; at least one of carrier-aggregation capabilities, different bearer capabilities, and closed subscriber group (CSG) capabilities of a neighbor base stations, and fine tunes parameters associated with deciding on the future handover-candidates; information with respect to the specific radio points near to a neighbor base station to optimize system parameters including at least one of power-levels, mobility measurements, or threshold configurations; system information about neighbors to a neighboring base station; or identifying system level issues related to configuration changes on neighboring base stations.

Example 29 includes method of any of examples 15-28, further comprising: triggering alarms indicating system level configuration changes at a neighboring base station based on changes to selected items of neighbor information.

Example 30 includes the method of any of examples 15-29, further comprising: purging items of neighbor information based on a length of time since extraction.

In various alternative embodiments, system and/or device elements, method steps, or example implementations described throughout this disclosure (such as any of the base stations, C-RAN, eNodeBs, core networks, radio points, baseband controllers, back-haul and front-haul networks, user equipment, mobility management entity, serving gateway, handover request parser, cache, handover function, interfaces, or sub-parts of any thereof, for example) may be implemented at least in part using one or more computer systems, field programmable gate arrays (FPGAs), or similar devices comprising a processor coupled to a memory and executing code to realize those elements, steps, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High-Speed Integrated Circuit (VHSIC) Hardware Description Language (VHDL).

As used herein, terms such as "base station", "cloud radio access network", "C-RAN", "eNodeB" and "eNB", "radio point", "network", "baseband controller", "user equipment", "mobility management entity", "serving gateway", "parser", "cache", "handover function", each refer to non-generic elements of a wireless communication system that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A base station comprising:
at least one processor coupled to a memory, wherein the base station is configured to communicatively couple to a core network for at least one wireless network operator, wherein the base station radiates downlink radio frequency signals to at least one user equipment (UE) served by the base station and receives uplink radio frequency signals from the at least one UE served by the base station in order to provide wireless communication services within a cell, wherein the processor is configured to implement:
a user equipment handover function that receives and processes a handover request message for a UE transferring to the cell from a neighboring cell, wherein the handover request message was sent to the base station in response to a handover required message generated by a neighboring base station serving the neighboring cell; and a handover request parser that evaluates information elements in the handover request message to extract neighbor information describing a configuration and operational parameters of the neighboring base station and information otherwise not transmitted between the neighboring base station and the base station, wherein the handover request parser stores the extracted neighbor information as a set of neighbor information in the memory; and wherein the processor is configured to adjust operation and configuration of the base station to facilitate the identification of additional information and triggering of alarms based on the set of neighbor information stored in the memory.

2. The base station of claim 1, wherein the base station comprises part of a cloud radio access network (C-RAN) architecture comprising a baseband controller and a plurality of radio points.

3. The base station of claim 2, wherein the baseband controller is communicatively coupled to the plurality of radio points by a switched Ethernet network.

4. The base station of claim 1, wherein the set of neighbor information stored in the memory is stored in the form of a neighbor relations table.

5. The base station of claim 1, further comprising a cache coupled to the handover request parser.

6. The base station of claim 5, wherein the handover request parser temporarily stores the extracted neighbor information in the cache until a successful handover of the UE is confirmed.

7. The base station of claim 5, wherein the handover request parser transfers the extracted neighbor information from the cache to the set of neighbor information stored in the memory in response to receiving a handover confirm message from the UE.

8. The base station of claim 1, wherein the information elements from the handover request message comprise a Source-to-Target Transparent Container, wherein the handover request parser generates the extracted neighbor information from the Source-to-Target Transparent Container.

9. The base station of claim 1, wherein the extracted neighbor information includes at least operating band, bandwidth and radio resource configuration information for the neighboring base station providing wireless communication services to the neighboring cell.

10. The base station of claim 1, wherein the handover request parser is further configured to evaluate information elements embedded into a handover command message associated with UE transferring from the cell to a neighboring cell, to extract additional neighbor information describing a configuration of a neighboring base station serving the neighboring cell.

11. The base station of claim 10, wherein the information elements from the handover command message comprise a Target-to-Source Transparent Container, wherein the handover request parser generates the extracted additional neighbor information from the Target-to-Source Transparent Container.

12. The base station of claim 1, wherein based on the extracted neighbor information, the base station identifies one or more of:

newly introduced carrier frequencies or Radio Access Technologies (RAT) frequency carriers;

at least one of carrier-aggregation capabilities, different bearer capabilities, and closed subscriber group (CSG) capabilities of a neighbor base stations, and fine tunes parameters associated with deciding on the future handover-candidates;

information with respect to the specific radio points near to a neighbor base station to optimize system parameters including at least one of power-levels, mobility measurements, or threshold configurations;

system information about neighbors to a neighboring base station; or identifying system level issues related to configuration changes on neighboring base stations.

13. The base station of claim 1, wherein the processor is configured to trigger alarms indicating system level configuration changes at a neighboring base station based on changes to selected items of neighbor information.

14. The base station of claim 1, wherein the UE Handover Request Parser is configured to purge items of neighbor information based on a length of time since extraction.

15. A method for passive neighbor information collection for a base station, wherein the base station is communicatively coupled to a core network for at least one wireless network operator, wherein the base station radiates downlink radio frequency signals to at least one user equipment (UE) served by the base station and receive uplink radio frequency signals from the at least one UE served by the base station in order to provide wireless communication services within a cell, the method comprising:

receiving a handover request message for a UE being handed over to the base station from a neighboring base station, wherein, the handover request message was sent in response to a handover required message generated by the neighboring base station;

parsing information elements from the handover request message to extract neighbor information about the neighboring base station, wherein the neighbor information describes a configuration and operational parameters of the neighboring base station and information otherwise not transmitted between the neighboring base station and the base station;

storing extracted neighbor information as a set of neighbor information in a memory; and adjusting operation and configuration of the base to facilitate the identification of additional information and triggering of alarms based on the set of neighbor information.

16. The method of claim 15, wherein the base station comprises part of a cloud radio access network (C-RAN) architecture comprising a baseband controller and a plurality of radio points.

17. The method of claim 16, wherein the baseband controller is communicatively coupled to the plurality of radio points by a switched Ethernet network.

18. The method of claim 15, wherein the UE being handed over to the base station is transferring to the cell from a neighboring cell.

19. The method of claim 15, further comprising:

caching the extracted neighbor information prior to storing the extracted neighbor information in the set of neighbor information in the memory; and transferring the extracted neighbor information from the cache to the set of neighbor information stored in the memory when a successful handover of the UE is confirmed.

20. The method of claim 15, wherein the extracted neighbor information is transferred to the set of neighbor information stored in the memory in response to receiving a handover confirm message from the UE.

21. The method of claim 15, wherein the set of neighbor information stored in the memory is stored in the form of a neighbor relations table.

22. The method of claim 15, wherein the information elements from the handover request message comprise a Source-to-Target Transparent Container, wherein the extracted neighbor information is extracted from the Source-to-Target Transparent Container.

23. The method of claim 15, wherein the extracted neighbor information includes at least operating band, bandwidth and radio resource configuration information for the neighboring base station providing wireless communication services to a neighboring cell.

24. The method of claim 15, wherein the base station providing wireless communication services to the cell comprises a target eNodeB and the neighboring base station providing wireless communication services to a neighboring cell comprises a source eNodeB, wherein the handover request message is associated with a handover of the UE from the source eNodeB to the target eNodeB.

25. The method of claim 15, wherein the base station and neighboring base station are both communicatively coupled to the core network by a back-haul network.

26. The method of claim 15, further comprising:
evaluating information elements embedded into a handover command message associated with UE transferring from the cell to a neighboring cell, to extract additional neighbor information describing a configuration of a neighboring base station serving the neighboring cell.

27. The method of claim 26, wherein the information elements from the handover command message comprise a Target-to-Source Transparent Container, wherein the handover request parser generates the extracted additional neighbor information from the Target-to-Source Transparent Container.

28. The method of claim 15, wherein based on the extracted neighbor information, the base station identifies one or more of:
newly introduced carrier frequencies or Radio Access Technologies (RAT) frequency carriers;
at least one of carrier-aggregation capabilities, different bearer capabilities, and closed subscriber group (CSG) capabilities of a neighbor base stations, and fine tunes parameters associated with deciding on the future handover-candidates;
information with respect to the specific radio points near to a neighbor base station to optimize system parameters including at least one of power-levels, mobility measurements, or threshold configurations;
system information about neighbors to a neighboring base station; or
identifying system level issues related to configuration changes on neighboring base stations.

29. The method of claim 15, further comprising:
triggering alarms indicating system level configuration changes at a neighboring base station based on changes to selected items of neighbor information.

30. The method of claim 15, further comprising:
purging items of neighbor information based on a length of time since extraction.

* * * * *